(12) United States Patent
Hashimoto et al.

(10) Patent No.: US 12,510,090 B2
(45) Date of Patent: Dec. 30, 2025

(54) VACUUM PUMP, VACUUM PUMP CONTROLLER, AND REMOTE CONTROLLER

(71) Applicant: Edwards Japan Limited, Yachiyo (JP)

(72) Inventors: Masayuki Hashimoto, Yachiyo (JP); Yoshinobu Ohtachi, Yachiyo (JP); Yasushi Maejima, Yachiyo (JP); Tsutomu Takaada, Yachiyo (JP)

(73) Assignee: Edwards Japan Limited, Yachiyo (JP)

( * ) Notice: Subject to any disclaimer, the term of this patent is extended or adjusted under 35 U.S.C. 154(b) by 0 days.

(21) Appl. No.: 18/279,349

(22) PCT Filed: Mar. 11, 2022

(86) PCT No.: PCT/JP2022/010896
§ 371 (c)(1),
(2) Date: Aug. 29, 2023

(87) PCT Pub. No.: WO2022/196558
PCT Pub. Date: Sep. 22, 2022

(65) Prior Publication Data
US 2024/0167484 A1    May 23, 2024

(30) Foreign Application Priority Data
Mar. 19, 2021    (JP) .................. 2021-046536

(51) Int. Cl.
*F04D 27/00*    (2006.01)
*F04D 19/04*    (2006.01)
(Continued)

(52) U.S. Cl.
CPC ............. *F04D 27/00* (2013.01); *F04D 19/04* (2013.01); *F04D 19/042* (2013.01);
(Continued)

(58) Field of Classification Search
CPC ........ F04D 27/00; F04D 19/04; F04D 19/042; F05D 2270/3015; F05D 2270/303; G08C 17/00
See application file for complete search history.

(56) References Cited

U.S. PATENT DOCUMENTS 4,655,688 A * 4/1987 Bohn .................. F04C 19/001
417/18
6,204,776 B1    3/2001 Nomura
(Continued)

FOREIGN PATENT DOCUMENTS

EP    2818718 A1    12/2014
JP    2007303420 A    11/2007
(Continued)

OTHER PUBLICATIONS

International Search Report and Written Opinion of International Application No. PCT/JP2022/010896, dated Jun. 7, 2022, 10 Pages.
(Continued)

*Primary Examiner* — Andrew J Marien
(74) *Attorney, Agent, or Firm* — Shumaker & Sieffert, P.A.

(57) ABSTRACT

A vacuum pump, a vacuum pump controller, and a remote controller are provided that can reduce the workload of users and field service engineers. A vacuum pump 10 includes a turbomolecular pump 100 that exhausts gas inside a semiconductor manufacturing apparatus X, and a controller 200 that performs control on the turbomolecular pump 100. The controller 200 includes a remote signal receiving means that receives a command signal from a remote controller 300, which remotely controls the turbomolecular pump 100, and changes a setting relating to an operating specification of the turbomolecular pump 100 on the basis of the command signal received by the remote signal receiving means.

6 Claims, 9 Drawing Sheets

(51) Int. Cl.
*F04D 27/02* (2006.01)
*G08C 17/00* (2006.01)

(52) U.S. Cl.
CPC ......... *F04D 27/0261* (2013.01); *G08C 17/00* (2013.01); *F05D 2270/3015* (2013.01); *F05D 2270/303* (2013.01)

(56) References Cited

U.S. PATENT DOCUMENTS

| | | | |
|---|---|---|---|
| 8,344,875 | B2 | 1/2013 | Becker et al. |
| 2004/0013531 | A1* | 1/2004 | Curry ................ F04D 27/0261 |
| | | | 417/42 |
| 2005/0042118 | A1* | 2/2005 | Sekiguchi ............ F04D 17/168 |
| | | | 417/423.4 |
| 2005/0201882 | A1* | 9/2005 | Maccarrone ......... F04B 49/065 |
| | | | 417/423.4 |
| 2015/0219116 | A1* | 8/2015 | Tsutsui ................ F04D 29/584 |
| | | | 415/175 |
| 2015/0226229 | A1* | 8/2015 | Tsutsui ................ F04D 27/006 |
| | | | 415/47 |
| 2016/0160877 | A1* | 6/2016 | Sakaguchi ............ F04D 29/644 |
| | | | 415/177 |
| 2021/0010479 | A1 | 1/2021 | Miwata et al. |
| 2022/0333607 | A1 | 10/2022 | Fukami et al. |

FOREIGN PATENT DOCUMENTS

| | | |
|---|---|---|
| JP | 2009009786 A | 1/2009 |
| JP | 2010059908 A | 3/2010 |
| WO | 2019188732 A1 | 10/2019 |
| WO | 2021060003 A1 | 4/2021 |

OTHER PUBLICATIONS

Communication pursuant to Rule 164(1) EPC from counterpart European Application No. 22771306.2, dated Jan. 2, 2025, 12 Pages.

* cited by examiner

| SETTING OF TURBOMOLECULAR PUMP OPERATING STATE | | SPECIFICATION 1 | SPECIFICATION 2 | SPECIFICATION 3 | SPECIFICATION 4 |
|---|---|---|---|---|---|
| RATED ROTATIONAL SPEED SETTING [rpm] | | ω1 | ω2 | ω3 | ω4 |
| TMS SET TEMPERATURE [°C] | | NOT SET | T2 | T3 | T4 |
| EXHAUST SPEED [L/s] | N₂ | STANDARD | EQUIVALENT TO SPECIFICATION 1 | EQUIVALENT TO SPECIFICATION 1 | LOWER THAN SPECIFICATION 1 |
| | Ar | STANDARD | EQUIVALENT TO SPECIFICATION 1 | EQUIVALENT TO SPECIFICATION 1 | LOWER THAN SPECIFICATION 1 |
| | H₂ | STANDARD | EQUIVALENT TO SPECIFICATION 1 | EQUIVALENT TO SPECIFICATION 1 | LOWER THAN SPECIFICATION 1 |
| COMPRESSION RATIO | N₂ | STANDARD | EQUIVALENT TO SPECIFICATION 1 | EQUIVALENT TO SPECIFICATION 1 | LOWER THAN SPECIFICATION 1 |
| | H₂ | STANDARD | EQUIVALENT TO SPECIFICATION 1 | EQUIVALENT TO SPECIFICATION 1 | LOWER THAN SPECIFICATION 1 |
| ULTIMATE PRESSURE [Pa] | | STANDARD | EQUIVALENT TO SPECIFICATION 1 | EQUIVALENT TO SPECIFICATION 1 | LOWER THAN SPECIFICATION 1 |
| PERMISSIBLE FLOW RATE [SCCM] | N₂ | STANDARD | LOWER THAN SPECIFICATION 1 | LOWER THAN SPECIFICATION 2 | LOWER THAN SPECIFICATION 2 AND HIGHER THAN SPECIFICATION 3 |
| | Ar | STANDARD | LOWER THAN SPECIFICATION 1 | LOWER THAN SPECIFICATION 2 | LOWER THAN SPECIFICATION 2 AND HIGHER THAN SPECIFICATION 3 |
| PUMP INTERNAL TEMPERATURE (GAS FLOW PASSAGE) [°C] | | Tp1 | Tp2 | Tp3 | Tp4 |
| CONTROL MODE OF TMS CONTROL | | NO TMS CONTROL (CONTINUOUS WATER COOLING) | TMS STANDARD MODE | TMS FIRST SPECIAL MODE | TMS SECOND SPECIAL MODE |

* MAGNITUDE RELATIONSHIP OF RATED ROTATIONAL SPEED: $\omega1=\omega2=\omega3, \omega4<\omega1$

* MAGNITUDE RELATIONSHIP OF TMS SET TEMPERATURE: $T2<T3<T4$

* MAGNITUDE RELATIONSHIP OF PUMP INTERNAL TEMPERATURE: $Tp1<Tp2<Tp3<Tp4$

Fig. 7

VACUUM PUMP, VACUUM PUMP CONTROLLER, AND REMOTE CONTROLLER

This application is a U.S. national phase application under 35 U.S.C. § 371 of international application number PCT/JP2022/010896 filed on Mar. 11, 2022, which claims the benefit of JP application number 2021-046536 filed on Mar. 19, 2021. The entire contents of each of international application number PCT/JP2022/010896 and JP application number 2021-046536 are incorporated herein by reference.

TECHNICAL FIELD

The present disclosure relates to a vacuum pump, a vacuum pump controller, and a remote controller.

BACKGROUND

As one type of vacuum pump that exhausts gas inside the exhaust target apparatus, a turbomolecular pump is known that exhausts gas by hitting the gas molecules drawn into the pump main body with rotor blades. A turbomolecular pump may create a vacuum in a chamber of a semiconductor manufacturing apparatus and exhaust the process gas used to manufacture semiconductors from the chamber.

The bottom section of the outer cylinder of the turbomolecular pump may have has a base portion. A heater for heating the base portion and a water-cooled tube for cooling the base portion are provided at the outer circumference of the base portion. The turbomolecular pump includes a sensor that measures the temperature of a motor that rotates rotor blades, a sensor that measures the internal temperature of the base portion, and a sensor that measures the exterior temperature of the base portion, and sends the detection signals of these sensors to the controller. This controller is configured to be capable of sending an on/off control command signal to the heater of the turbomolecular pump, and sending an on/off control command to a solenoid valve that controls the flow of cooling water to the water-cooled tube of the turbomolecular pump. When the controller sends an ON command signal to the solenoid valve, the solenoid valve opens so that cooling water flows through the water-cooled tube. When the controller sends an OFF command signal, the solenoid valve closes so that the cooling water stops flowing through the water-cooled tube.

SUMMARY

With the semiconductor manufacturing apparatus to which the turbomolecular pump is attached, a pump may be selected for a predetermined process. With recent increases in the complexity of processes, pumps of many specifications may be prepared.

At the same time, the number of chambers per semiconductor manufacturing apparatus has also increased. As such, in preparation for the maintenance of turbomolecular pumps, a backup turbomolecular pump may be used for each specification, resulting in a large inventory.

As one solution to the above issues, a user of a semiconductor manufacturing apparatus to which a turbomolecular pump is attached may desire to change the operating specification of the turbomolecular pump. In this case, the user or a field service engineer may go to the place where the turbomolecular pump and the controller are installed, detach and attach a specification changing device that changes the operating specification of the turbomolecular pump, and input an instruction to change the setting relating to the operating specification of the turbomolecular pump by manually operating the controller after detaching and attaching the device resulting in a significant workload of the users and field service engineers.

In view of the foregoing, it is an object of the present disclosure to provide a vacuum pump, a vacuum pump controller, and a remote controller that can reduce the workload of the users and field service engineers.

To achieve the above object, a vacuum pump of the present disclosure includes:
 a pump main body configured to exhaust gas inside an exhaust target apparatus; and
 a controller configured to perform control on the pump main body, wherein
 the controller includes a remote signal receiving means configured to receive a command signal from a remote controller that remotely controls the pump main body, and
 the controller is configured to change a setting relating to an operating specification of the pump main body on the basis of the command signal received by the remote signal receiving means.

In the above vacuum pump,
 the controller may be configured to, when the remote signal receiving means receives the command signal from the remote controller while the pump main body is in operation, change the setting on the basis of the command signal without stopping the operation of the pump main body.

In the above vacuum pump,
 a specification changing device configured to change the operating specification of the pump main body, may be further provided,
 the controller may be configured to change a setting relating to operation of the specification changing device on the basis of the command signal received by the remote signal receiving means.

In the above vacuum pump,
 the specification changing device may be a heating means configured to heat the pump main body or a cooling means configured to cool the pump main body.

To achieve the above object, another vacuum pump of the present disclosure is
 a vacuum pump including a pump main body configured to exhaust gas inside an exhaust target apparatus, the vacuum pump including:
 a control target device that is capable of changing an operating specification of the pump main body; and
 a specification setting device configured to change an operating specification of the control target device to change a setting relating to the operating specification of the pump main body.

To achieve the above object, a vacuum pump controller of the present disclosure includes:
 a control means configured to perform control on a pump main body that exhausts gas inside an exhaust target apparatus; and
 a remote signal receiving means configured to receive a command signal from a remote controller that remotely controls the pump main body, wherein the control means is configured to change a setting relating to an operating specification of the pump main body on the basis of the command signal received by the remote signal receiving means.

To achieve the above object, a remote controller of the present disclosure includes:

a remote signal transmitting means configured to transmit a command signal to a controller that performs control on a pump main body that exhausts gas inside an exhaust target apparatus; and a remote control means configured to remotely control the pump main body by causing the remote signal transmitting means to transmit the command signal to the controller, wherein the remote control means is configured to cause the remote signal transmitting means to transmit the command signal to the controller to cause the controller to change a setting relating to an operating specification of the pump main body on the basis of the received command signal.

According to the present disclosure, it is possible to provide a vacuum pump, a vacuum pump controller, and a remote controller that can reduce the workload of the users and field service engineers.

BRIEF DESCRIPTION OF THE DRAWINGS

FIG. 7 is a diagram illustrating specifications of a turbomolecular pump according to an example of the present disclosure.

DETAILED DESCRIPTION

Figure 1:
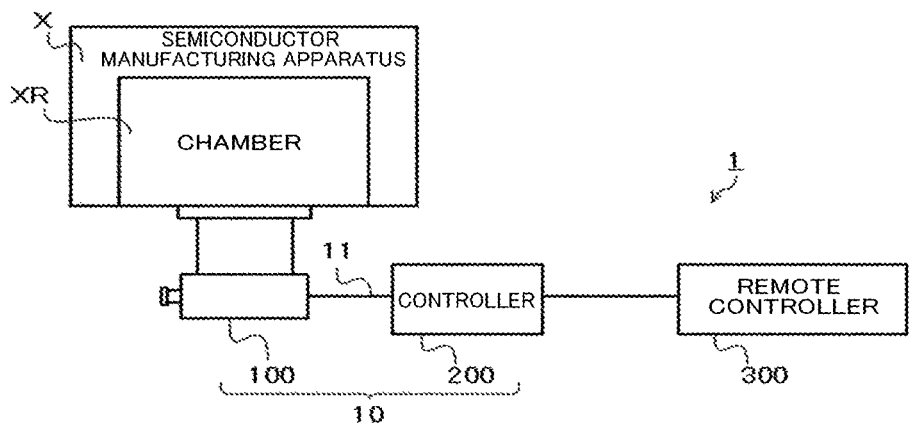
FIG. 1 is a diagram showing a configuration of a vacuum pump system according to an example of the present disclosure.

Examples of the present disclosure are described below with reference to the drawings. In the drawings, the same reference numerals are given to the same or equivalent configurations.

A vacuum pump system 1 shown in FIG. 1 exhausts gas such as air and process gas inside a semiconductor manufacturing apparatus X. The semiconductor manufacturing apparatus X includes a chamber XR and manufactures semiconductors by performing various types of processes for manufacturing semiconductors in the chamber XR. Specific examples of processes performed by the semiconductor manufacturing apparatus X in the chamber XR include a process of forming circuits on semiconductor substrates by etching or coating, a process of introducing a process gas into the chamber XR, and a process of applying the process gas to the semiconductor substrates. The semiconductor manufacturing apparatus X is an example of an exhaust target apparatus. In the present example, the semiconductor manufacturing apparatus X is described as the exhaust target apparatus, but this is merely an example. The exhaust target apparatus may be any apparatus.

As shown in FIG. 1, the vacuum pump system 1 includes a vacuum pump 10 and a remote controller 300. The vacuum pump 10 includes a turbomolecular pump 100, which is attached to the chamber XR of the semiconductor manufacturing apparatus X and exhausts gas in the chamber XR, and a controller 200, which controls the turbomolecular pump 100 and monitors its operating state. The turbomolecular pump 100 is an example of a pump main body. In the present example, the pump main body is described as the turbomolecular pump 100, but this is merely an example. The pump main body may be a vacuum pump other than a turbomolecular pump, such as an oil-sealed rotary pump or a diaphragm-type vacuum pump.

The controller 200 is connected to the turbomolecular pump 100 via a connection cable 11, which is a signal transmission path, and transmits and receives signals to and from the turbomolecular pump 100 through wired communication via the connection cable 11. Specifically, the controller 200 transmits command signals to the turbomolecular pump 100 via the connection cable 11 to control the operation of the turbomolecular pump 100. Also, the controller 200 receives detection signals output from various sensors of the turbomolecular pump 100 via the connection cable 11 to monitor the operating state of the turbomolecular pump 100. In this example, the turbomolecular pump 100 and the controller 200 are described as being independent of each other and connected to each other via the connection cable 11. However, this is merely an example, and the turbomolecular pump 100 and the controller 200 may be integrated into a single apparatus.

The controller 200 transmits and receives signals by performing remote communication with the remote controller 300. It should be noted that the controller 200 may transmit and receive signals by performing remote communication with the remote controller 300 via a communication cable, or may transmit and receive signals by performing wireless communication with the remote controller 300. The controller 200 receives a command signal from the remote controller 300 through remote communication, and controls the turbomolecular pump 100 according to the received command signal. The remote controller 300 remotely controls the turbomolecular pump 100 according to an instruction from a user (for example, an operator at the factory where the semiconductor manufacturing apparatus X is installed). Specifically, the remote controller 300 receives an instruction input by a user, transmits a command signal corresponding to the received instruction to the controller 200 through remote communication, and causes the controller 200 to perform control on the turbomolecular pump 100 according to the received command signal to remotely control the turbomolecular pump 100. In this example, the remote controller 300 remotely controls the turbomolecular pump 100, but this is merely an example. A monitoring system including a host computer (server) may function as a remote controller to remotely control the turbomolecular pump 100. The remote controller 300 is installed in the factory where the semiconductor manufacturing apparatus X is installed, at a location away from the location where the semiconductor manufacturing apparatus X and the vacuum pump 10 are installed. It should be noted that this is merely an example, and the remote controller 300 may be installed at a location away from the factory where the semiconductor manufacturing apparatus X and the vacuum pump 10 are installed.

Figure 2:
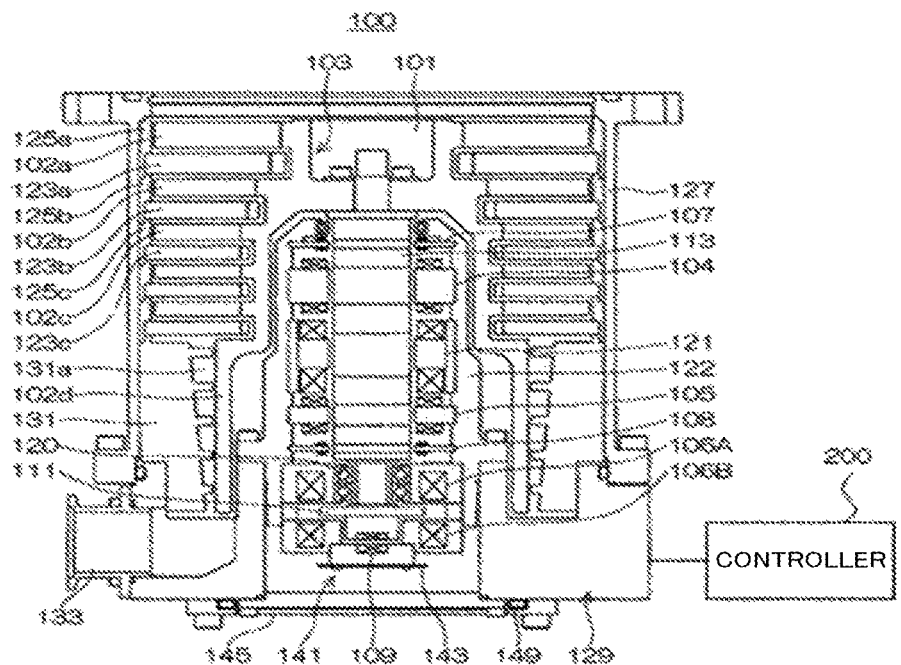
FIG. 2 is a longitudinal cross-sectional view of a turbomolecular pump according to an example of the present disclosure.

FIG. 2 is a longitudinal cross-sectional view of the turbomolecular pump 100. As shown in FIG. 2, the turbomolecular pump 100 has a circular outer cylinder 127 having an inlet port 101 at its upper end. A rotating body 103 in the outer cylinder 127 includes a plurality of rotor blades 102 (102a, 102b, 102c, . . . ), which are turbine blades for gas suction and exhaustion, in its outer circumference section. The rotor blades 102 extend radially in multiple stages. The rotating body 103 has a rotor shaft 113 in its center. The rotor shaft 113 is supported and suspended in the air and position-controlled by a magnetic bearing of 5-axis control, for example. The rotating body 103 is typically made of a metal such as aluminum or an aluminum alloy.

Upper radial electromagnets 104 include four electromagnets arranged in pairs on an X-axis and a Y-axis. Four upper radial sensors 107 are provided in close proximity to the upper radial electromagnets 104 and associated with the respective upper radial electromagnets 104. Each upper radial sensor 107 may be an inductance sensor or an eddy current sensor having a conduction winding, for example, and detects a position of the rotor shaft 113 based on a change in the inductance of the conduction winding, which changes according to the position of the rotor shaft 113. The upper radial sensors 107 are configured to detect a radial displacement of the rotor shaft 113, that is, the rotating body 103 fixed to the rotor shaft 113, and send it to the controller 200.

In the controller 200, for example, a compensation circuit having a PID adjustment function generates an excitation control command signal for the upper radial electromagnets 104 based on a position signal detected by the upper radial sensors 107. Based on this excitation control command signal, an amplifier circuit 150 (described below) shown in FIG. 3 controls and excites the upper radial electromagnets 104 to adjust a radial position of an upper part of the rotor shaft 113.

The rotor shaft 113 may be made of a high magnetic permeability material (such as iron and stainless steel) and is configured to be attracted by magnetic forces of the upper radial electromagnets 104. The adjustment is performed independently in the X-axis direction and the Y-axis direction. Lower radial electromagnets 105 and lower radial sensors 108 are arranged in a similar manner as the upper radial electromagnets 104 and the upper radial sensors 107 to adjust the radial position of the lower part of the rotor shaft 113 in a similar manner as the radial position of the upper part.

Additionally, axial electromagnets 106A and 106B are arranged so as to vertically sandwich a metal disc 111, which has a shape of a circular disc and is provided in the lower part of the rotor shaft 113. The metal disc 111 is made of a high magnetic permeability material such as iron. An axial sensor 109 is provided to detect an axial displacement of the rotor shaft 113 and send an axial position signal to the controller 200.

In the controller 200, the compensation circuit having the PID adjustment function may generate an excitation control command signal for each of the axial electromagnets 106A and 106B based on the signal on the axial position detected by the axial sensor 109. Based on these excitation control command signals, the amplifier circuit 150 controls and excites the axial electromagnets 106A and 106B separately so that the axial electromagnet 106A magnetically attracts the metal disc 111 upward and the axial electromagnet 106B attracts the metal disc 111 downward. The axial position of the rotor shaft 113 is thus adjusted.

As described above, the controller 200 appropriately adjusts the magnetic forces exerted by the axial electromagnets 106A and 106B on the metal disc 111, magnetically levitates the rotor shaft 113 in the axial direction, and suspends the rotor shaft 113 in the air in a non-contact manner. The amplifier circuit 150, which controls and excites the upper radial electromagnets 104, the lower radial electromagnets 105, and the axial electromagnets 106A and 106B, is described below.

The motor 121 includes a plurality of magnetic poles circumferentially arranged to surround the rotor shaft 113. Each magnetic pole is controlled by the controller 200 so as to drive and rotate the rotor shaft 113 via an electromagnetic force acting between the magnetic pole and the rotor shaft 113. The motor 121 also includes a rotational speed sensor (not shown), such as a Hall element, a resolver, or an encoder, and the rotational speed of the rotor shaft 113 is detected based on a detection signal of the rotational speed sensor.

Furthermore, a phase sensor (not shown) is attached adjacent to the lower radial sensors 108 to detect the phase of rotation of the rotor shaft 113. The controller 200 detects the position of the magnetic poles using both detection signals of the phase sensor and the rotational speed sensor.

A plurality of stator blades 123 (123a, 123b, 123c, . . . ) are arranged slightly spaced apart from the rotor blades 102 (102a, 102b, 102c, . . . ). Each rotor blades 102 (102a, 102b, 102c, . . . ) is inclined by a predetermined angle from a plane perpendicular to the axis of the rotor shaft 113 in order to transfer exhaust gas molecules downward through collision. The stator blades 123 (123a, 123b, 123c, . . . ) are made of a metal such as aluminum, iron, stainless steel, copper, or a metal such as an alloy containing these metals as components.

The stator blades 123 are also inclined by a predetermined angle from a plane perpendicular to the axis of the rotor shaft 113. The stator blades 123 extend inward of the outer cylinder 127 and alternate with the stages of the rotor blades 102. The outer circumference ends of the stator blades 123 are inserted between and thus supported by a plurality of layered stator blade spacers 125 (125a, 125b, 125c, . . . ).

The stator blade spacers 125 are ring-shaped members made of a metal, such as aluminum, iron, stainless steel, or copper, or an alloy containing these metals as components, for example. The outer cylinder 127 is fixed to the outer circumferences of the stator blade spacers 125 with a slight gap. A base portion 129 is located at the base of the outer cylinder 127. The base portion 129 has an outlet port 133 providing communication to the outside. The exhaust gas transferred to the base portion 129 through the inlet port 101 from the chamber (vacuum chamber) is then sent to the outlet port 133.

According to the application of the turbomolecular pump 100, a threaded spacer 131 may be provided between the lower part of the stator blade spacer 125 and the base portion 129. The threaded spacer 131 is a cylindrical member made of a metal such as aluminum, copper, stainless steel, or iron, or an alloy containing these metals as components. The threaded spacer 131 has a plurality of helical thread grooves 131a engraved in its inner circumference surface. When exhaust gas molecules move in the rotation direction of the rotating body 103, these molecules are transferred toward the outlet port 133 in the direction of the helix of the thread grooves 131a. In the lowermost section of the rotating body 103 below the rotor blades 102 (102a, 102b, 102c, . . . ), a cylindrical portion 102d extends downward. The outer circumference surface of the cylindrical portion 102d is cylindrical and projects toward the inner circumference surface of the threaded spacer 131. The outer circumference surface is adjacent to but separated from the inner circumference surface of the threaded spacer 131 by a predetermined gap. The exhaust gas transferred to the thread groove 131a by the rotor blades 102 and the stator blades 123 is guided by the thread groove 131a to the base portion 129.

The base portion 129 is a disc-shaped member forming the base section of the turbomolecular pump 100, and is generally made of a metal such as iron, aluminum, or stainless steel. The base portion 129 physically holds the turbomolecular pump 100 and also serves as a heat conduction passage. As such, the base portion 129 is preferably made of rigid metal with high thermal conductivity, such as iron, aluminum, or copper.

In this configuration, when the motor 121 drives and rotates the rotor blades 102 together with the rotor shaft 113, the interaction between the rotor blades 102 and the stator blades 123 causes the suction of exhaust gas from the chamber through the inlet port 101. The rotational speed of the rotor blades 102 is usually 20000 rpm to 90000 rpm, and the circumferential speed at the tip of a rotor blades 102 reaches 200 m/s to 400 m/s. The exhaust gas taken through the inlet port 101 moves between the rotor blades 102 and the stator blades 123 and is transferred to the base portion 129. At this time, factors such as the friction heat generated when the exhaust gas comes into contact with the rotor blades 102 and the conduction of heat generated by the motor 121 increase the temperature of the rotor blades 102. This heat is conducted to the stator blades 123 through radiation or conduction via gas molecules of the exhaust gas, for example.

The stator blade spacers 125 are joined to each other at the outer circumference portion and conduct the heat received by the stator blades 123 from the rotor blades 102, the friction heat generated when the exhaust gas comes into contact with the stator blades 123, and the like to the outside.

In the above description, the threaded spacer 131 is provided at the outer circumference of the cylindrical portion 102d of the rotating body 103, and the thread grooves 131a are engraved in the inner circumference surface of the threaded spacer 131. However, conversely, thread grooves may be engraved in the outer circumference surface of the cylindrical portion 102d, while a spacer having a cylindrical inner circumference surface may be arranged around the outer circumference surface.

According to the application of the turbomolecular pump 100, to prevent the gas drawn through the inlet port 101 from entering an electrical portion, which includes the upper radial electromagnets 104, the upper radial sensors 107, the motor 121, the lower radial electromagnets 105, the lower radial sensors 108, the axial electromagnets 106A, 106B, and the axial sensor 109, the electrical portion may be surrounded by a stator column 122. The inside of the stator column 122 may be maintained at a predetermined pressure by purge gas.

In this case, the base portion 129 has a pipe (not shown) through which the purge gas is introduced. The introduced purge gas is sent to the outlet port 133 through gaps between a protective bearing 120 and the rotor shaft 113, between the rotor and the stator of the motor 121, and between the stator column 122 and the inner circumference cylindrical portion of the rotor blades 102.

The turbomolecular pump 100 may use the identification of the model and control based on individually adjusted unique parameters (for example, various characteristics associated with the model). To store these control parameters, the turbomolecular pump 100 includes an electronic circuit portion 141 in its main body. The electronic circuit portion 141 may include a semiconductor memory, such as an EEPROM, electronic components such as semiconductor elements for accessing the semiconductor memory, and a substrate 143 for mounting these components. The electronic circuit portion 141 is housed under a rotational speed sensor (not shown) near the center, for example, of the base portion 129, which forms the lower part of the turbomolecular pump 100, and is closed by an airtight bottom lid 145.

Some process gas introduced into the chamber in the manufacturing process of semiconductors has the property of becoming solid when its pressure becomes higher than a predetermined value or its temperature becomes lower than a predetermined value. In the turbomolecular pump 100, the pressure of the exhaust gas is lowest at the inlet port 101 and highest at the outlet port 133. When the pressure of the process gas increases beyond a predetermined value or its temperature decreases below a predetermined value while the process gas is being transferred from the inlet port 101 to the outlet port 133, the process gas is solidified and adheres and accumulates on the inner side of the turbomolecular pump 100.

For example, when SiCl4 is used as the process gas in an Al etching apparatus, according to the vapor pressure curve, a solid product (for example, AlCl3) is deposited at a low vacuum (760 [torr] to 10-2 [torr]) and a low temperature (about 20 [° C.]) and adheres and accumulates on the inner side of the turbomolecular pump 100. When the deposits of the process gas accumulate in the turbomolecular pump 100, the accumulation may narrow the pump flow passage and degrade the performance of the turbomolecular pump 100. The above-mentioned product tends to solidify and adhere in areas with higher pressures, such as the vicinity of the outlet port 133 and the vicinity of the threaded spacer 131.

In some examples, a heater or annular water-cooled tube 149 (not shown) is wound around the outer circumference of the base portion 129, and a temperature sensor (e.g., a thermistor, not shown) is embedded in the base portion 129, for example. The signal of this temperature sensor is used to perform control to maintain the temperature of the base portion 129 at a constant high temperature (set temperature) by heating with the heater or cooling with the water-cooled tube 149 (hereinafter referred to as TMS (temperature management system)).

Figure 3:
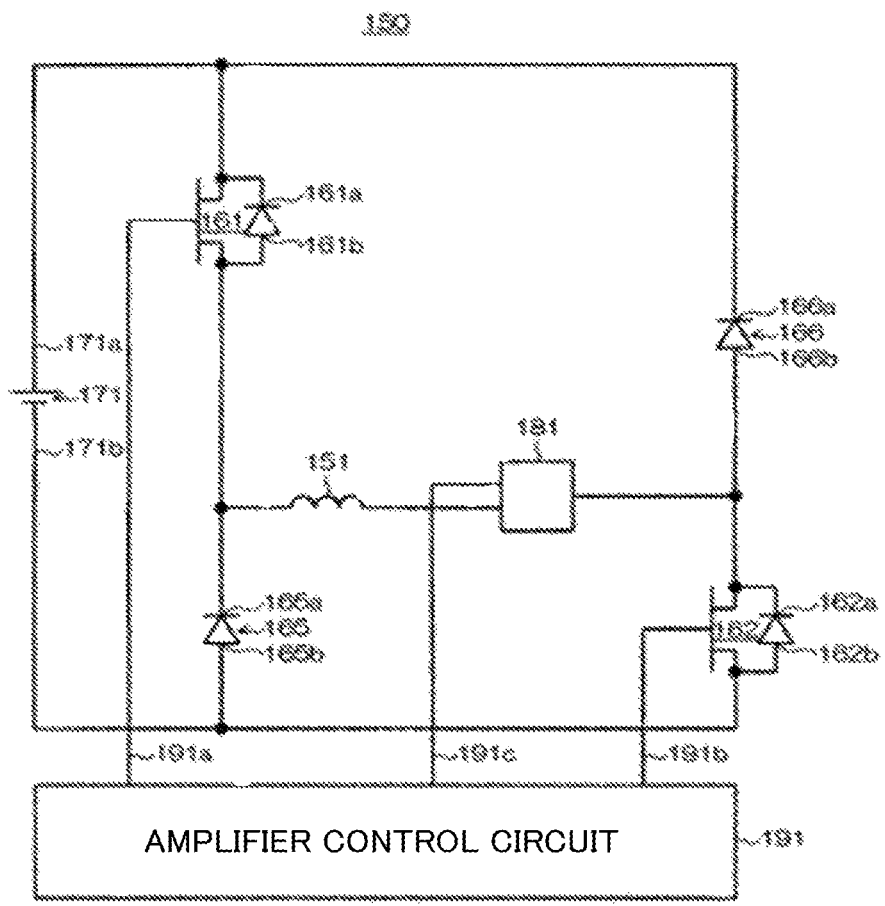
FIG. 3 is a circuit diagram of an amplifier circuit according to an example of the present disclosure.

The amplifier circuit 150 is now described that controls and excites the upper radial electromagnets 104, the lower radial electromagnets 105, and the axial electromagnets 106A and 106B of the turbomolecular pump 100 configured as described above. FIG. 3 is a circuit diagram of the amplifier circuit 150.

In FIG. 3, one end of an electromagnet winding 151 forming an upper radial electromagnet 104 or the like is connected to a positive electrode 171a of a power supply 171 via a transistor 161, and the other end is connected to a negative electrode 171b of the power supply 171 via a current detection circuit 181 and a transistor 162. Each transistor 161, 162 is a power MOSFET and has a structure in which a diode is connected between the source and the drain thereof.

In the transistor 161, a cathode terminal 161a of its diode is connected to the positive electrode 171a, and an anode terminal 161b is connected to one end of the electromagnet winding 151. In the transistor 162, a cathode terminal 162a of its diode is connected to a current detection circuit 181, and an anode terminal 162*b* is connected to the negative electrode 171*b*.

A diode 165 for current regeneration has a cathode terminal 165*a* connected to one end of the electromagnet winding 151 and an anode terminal 165*b* connected to the negative electrode 171*b*. Similarly, a diode 166 for current regeneration has a cathode terminal 166*a* connected to the positive electrode 171*a* and an anode terminal 166*b* connected to the other end of the electromagnet winding 151 via the current detection circuit 181. The current detection circuit 181 may include a Hall current sensor or an electric resistance element, for example.

The amplifier circuit 150 configured as described above corresponds to one electromagnet. Accordingly, when the magnetic bearing uses 5-axis control and has ten electromagnets 104, 105, 106A, and 106B in total, an identical amplifier circuit 150 is configured for each of the electromagnets. These ten amplifier circuits 150 are connected to the power supply 171 in parallel.

An amplifier control circuit 191 may be formed by a digital signal processor portion (not shown, hereinafter referred to as a DSP portion) of the controller 200. The amplifier control circuit 191 switches the transistors 161 and 162 between on and off.

The amplifier control circuit 191 is configured to compare a current value detected by the current detection circuit 181 (a signal reflecting this current value is referred to as a current detection signal 191*c*) with a predetermined current command value. The result of this comparison is used to determine the magnitude of the pulse width (pulse width time Tp1, Tp2) generated in a control cycle Ts, which is one cycle in PWM control. As a result, gate drive signals 191*a* and 191*b* having this pulse width are output from the amplifier control circuit 191 to gate terminals of the transistors 161 and 162.

Under certain circumstances such as when the rotational speed of the rotating body 103 reaches a resonance point during acceleration, or when a disturbance occurs during a constant speed operation, the rotating body 103 may use positional control at high speed and with a strong force. For this purpose, a high voltage of about 50 V, for example, is used for the power supply 171 to enable a rapid increase (or decrease) in the current flowing through the electromagnet winding 151. Additionally, a capacitor is generally connected between the positive electrode 171*a* and the negative electrode 171*b* of the power supply 171 to stabilize the power supply 171 (not shown).

In this configuration, when both transistors 161 and 162 are turned on, the current flowing through the electromagnet winding 151 (hereinafter referred to as an electromagnet current iL) increases, and when both are turned off, the electromagnet current iL decreases.

Also, when one of the transistors 161 and 162 is turned on and the other is turned off, a freewheeling current is maintained. Passing the freewheeling current through the amplifier circuit 150 in this manner reduces the hysteresis loss in the amplifier circuit 150, thereby limiting the power consumption of the entire circuit to a low level. Moreover, by controlling the transistors 161 and 162 as described above, high frequency noise, such as harmonics, generated in the turbomolecular pump 100 can be reduced. Furthermore, by measuring this freewheeling current with the current detection circuit 181, the electromagnet current iL flowing through the electromagnet winding 151 can be detected.

Figure 4:
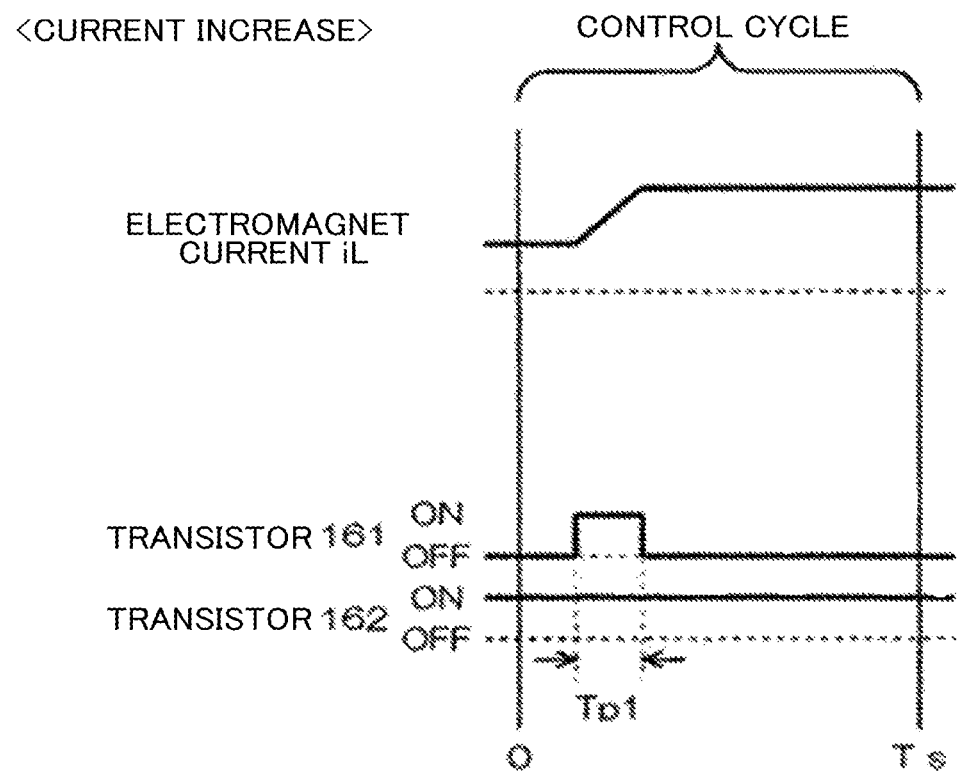
FIG. 4 is a time chart showing control performed when a current command value is greater than a detected value according to an example of the present disclosure.

That is, when the detected current value is smaller than the current command value, as shown in FIG. 4, the transistors 161 and 162 are simultaneously on only once in the control cycle Ts (for example, 100 μs) for the time corresponding to pulse width time Tp1. During this time, the electromagnet current iL increases accordingly toward the current value iLmax (not shown) that can be passed from the positive electrode 171*a* to the negative electrode 171*b* via the transistors 161 and 162.

Figure 5:
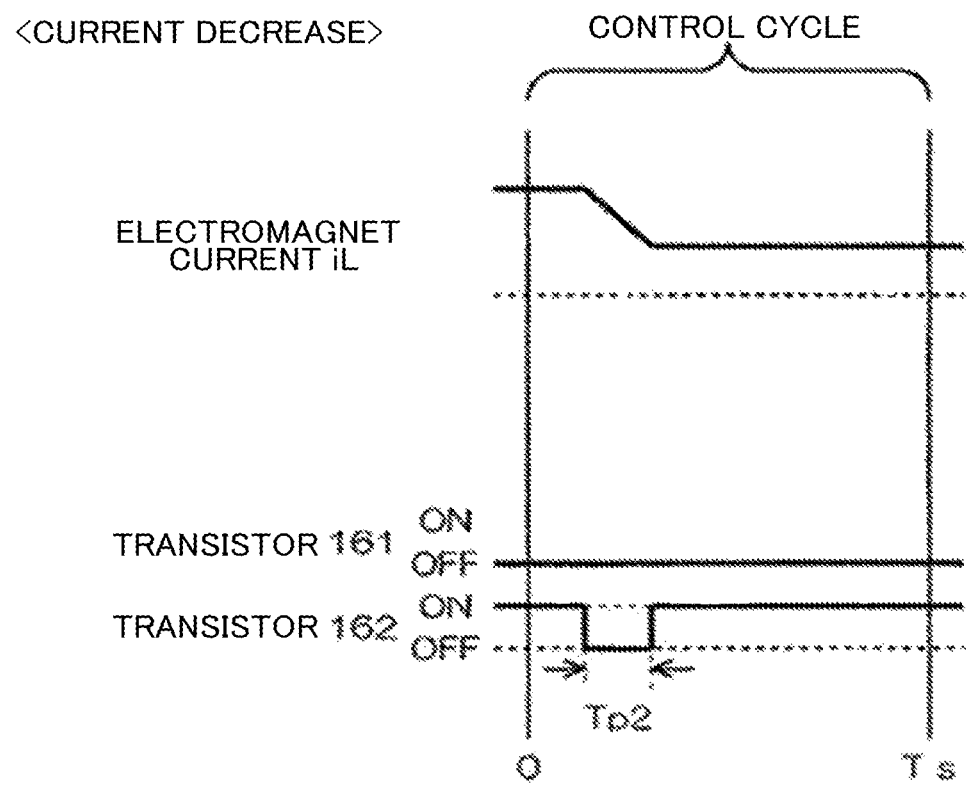
FIG. 5 is a time chart showing control performed when a current command value is less than a detected value according to an example of the present disclosure.

When the detected current value is larger than the current command value, as shown in FIG. 5, the transistors 161 and 162 are simultaneously off only once in the control cycle Ts for the time corresponding to pulse width time Tp2. During this time, the electromagnet current iL decreases accordingly toward the current value iLmin (not shown) that can be regenerated from the negative electrode 171*b* to the positive electrode 171*a* via the diodes 165 and 166.

In either case, after pulse width time Tp1, Tp2 has elapsed, one of the transistors 161 and 162 is on. During this period, the freewheeling current is thus maintained in the amplifier circuit 150.

Figure 6:
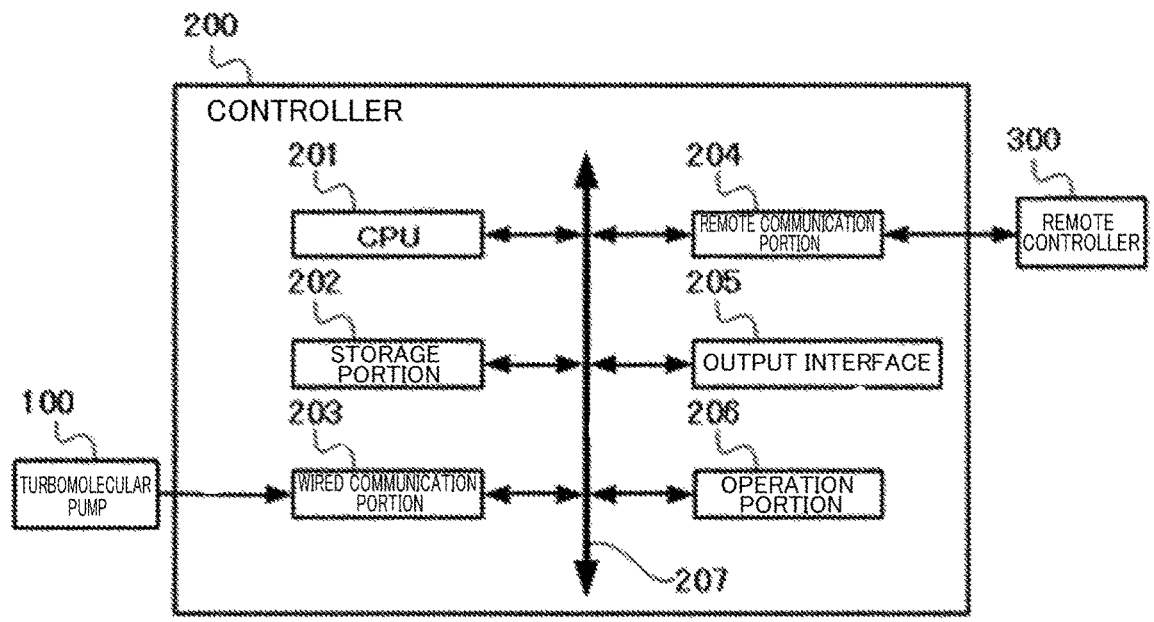
FIG. 6 is a diagram showing a configuration of a controller according to an example of the present disclosure.

The configuration and function of the controller 200 are now described. As shown in FIG. 6, the controller 200 includes a central processing unit (CPU) 201, a storage portion 202, a wired communication portion 203, a remote communication portion 204, an output interface 205, an operation portion 206, and a system bus 207.

The CPU 201 performs various types of processing according to programs and data stored in the storage portion 202. The storage portion 202 includes non-volatile memory (not shown) such as read-only memory (ROM), flash memory, or erasable programmable read only memory (EPROM), and stores, in a non-volatile manner, programs and data used by the CPU 201 to perform various types of processing. Also, the storage portion 202 includes random access memory (RAM) (not shown), which functions as a work area for the CPU 201.

Under the control of the CPU 201, the wired communication portion 203 performs wired communication with a device external to the controller 200 to transmit and receive signals. Specifically, the wired communication portion 203 includes a connector (not shown) to which the connection cable 11 described above is connected, and transmits and receives signals to and from the turbomolecular pump 100 via the connection cable 11. More specifically, the wired communication portion 203 transmits command signals generated by the CPU 201 to the turbomolecular pump 100 via the connection cable 11. The wired communication portion 203 also receives detection signals from various sensors of the turbomolecular pump 100 via the connection cable 11 and outputs the received detection signals to the CPU 201. The remote communication portion 204 performs remote communication with a device external to the controller 200 to transmit and receive signals. Specifically, the remote communication portion 204 includes a remote input/output (I/O) unit (not shown) and uses this remote I/O unit to transmit and receive signals to and from the remote controller 300 by performing remote communication through a communication network using a serial communication system. The remote communication portion 204 receives a command signal from the remote controller 300 by performing remote communication with the remote controller 300. The remote communication portion 204 is an example of a remote signal receiving means.

The output interface 205 presents information relating to the operating state of the turbomolecular pump 100 to the user. Specifically, the output interface 205 includes a liquid crystal display (LCD) panel (not shown), and displays on this LCD panel various types of images for notifying the operating state of the turbomolecular pump 100, such as a message indicating the setting of the operating state of the turbomolecular pump 100, a message indicating the current operating state of the turbomolecular pump 100, and an error message notifying a malfunction of the turbomolecular pump 100. Additionally, the output interface 205 includes indicator lamps (not shown) for indicating the operating state of the turbomolecular pump 100, such as a power lamp (not shown), which lights up when the power of the turbomolecular pump 100 is on, and an error lamp (not shown), which lights up when the turbomolecular pump 100 malfunctions. The output interface 205 switches on/off of these indicator lamps to notify the user of the operating state of the turbomolecular pump 100.

The operation portion 206 includes operators and receives input of various instructions by the user according to the user's operation on the operators. Specifically, the operation portion 206 includes, as operators, operation switches such as a start switch for receiving an instruction to start the turbomolecular pump 100 and a stop switch for receiving an instruction to stop the turbomolecular pump 100, and receives input of various instructions according to the user's operation on the operation switches. The operation switches of the operation portion 206 include a mode changeover switch for switching the operation mode of the controller 200 between a remote control mode, which performs control on the turbomolecular pump 100 according to command signals received by the remote communication portion 204 from the remote controller 300, and a manual operation control mode, which performs control on the turbomolecular pump 100 according to instructions input by the user by operating the operation portion 206. When the controller 200 is in operation in the remote control mode, the CPU 201 transmits a command signal corresponding to a command signal received from the remote controller 300 to the turbomolecular pump 100 via the wired communication portion 203 to set the control parameters of the turbomolecular pump 100 according to the received command signal and control the operation of the turbomolecular pump 100. When the controller 200 is in operation in the manual operation control mode, the CPU 201 transmits a command signal according to an instruction input by the user operating the operation portion 206 to the turbomolecular pump 100 via the wired communication portion 203 to set the control parameters of the turbomolecular pump 100 according to the input instruction and control the operation of the turbomolecular pump 100. In the following description of the present example, the operation mode of the controller 200 is set to the remote control mode. The system bus 207 is a transmission path for commands and data, and interconnects the CPU 201 to the operation portion 206.

The functions of the CPU 201 are now described in detail below. The CPU 201 causes the wired communication portion 203 to transmit a command signal to the turbomolecular pump 100 via the connection cable 11 and sets the control parameters of the turbomolecular pump 100 to control the operation of the turbomolecular pump 100. The CPU 201 is an example of a control means. The CPU 201 controls the operation of the turbomolecular pump 100 according to a command signal received from the remote controller 300 by the remote communication portion 204. Specifically, when the remote communication portion 204 receives from the remote controller 300 a command signal indicating to start the turbomolecular pump 100, the CPU 201 transmits a command signal via the wired communication portion 203 to start the turbomolecular pump 100. When the remote communication portion 204 receives from the remote controller 300 a command signal indicating to stop the turbomolecular pump 100, the CPU 201 transmits a command signal via the wired communication portion 203 to stop the turbomolecular pump 100.

When the remote communication portion 204 receives from the remote controller 300 a command signal indicating to check the setting of the operating specification of the turbomolecular pump 100, the CPU 201 generates a signal indicating the setting of the operating specification, and transmits the generated signal to the remote controller 300 via the remote communication portion 204. When the remote communication portion 204 receives from the remote controller 300 a command signal indicating to check the current operating specification of the turbomolecular pump 100, the CPU 201 generates a signal indicating the operating specification based on the detection signals input from the various sensors of the turbomolecular pump 100 via the wired communication portion 203, and transmits the generated signal to the remote controller 300 via the remote communication portion 204.

The turbomolecular pump 100 described above includes a heater (not shown) and the water-cooled tube 149 as specification changing devices for changing (controlling) the internal temperature of the turbomolecular pump 100, which is an example of an operating specification of the turbomolecular pump 100. For example, the heater is arranged in the base portion 129 of the turbomolecular pump 100 and heats the base portion 129. The heater is an example of a heating means. The water-cooled tube 149 is arranged in the base portion 129 of the turbomolecular pump 100 and cools the base portion 129. The water-cooled tube 149 is an example of a cooling means. A temperature sensor (e.g., thermistor, not shown) that measures the temperature of the base portion 129 is arranged in the base portion 129 of the turbomolecular pump 100. The CPU 201 receives a detection signal output by this temperature sensor via the wired communication portion 203. According to the detection signal received from the temperature sensor, the CPU 201 performs TMS control that controls the heating of the base portion 129 by the heater and the cooling of the base portion 129 by the water-cooled tube 149 so as to keep the temperature of the base portion 129 at the TMS set temperature that is preset.

In the TMS control, the CPU 201 performs control that starts the heating of the base portion 129 by sending an ON control command signal to the heater via the wired communication portion 203, or stops the heating of the base portion 129 by sending an OFF control command signal to the heater. Also, in the TMS control, the CPU 201 performs control that sends an ON command signal via the wired communication portion 203 to a solenoid valve (not shown) that controls the flow of cooling water to the water-cooled tube 149 to open the solenoid valve, and sends an OFF command signal to the solenoid valve to close the solenoid valve. When the CPU 201 sends an ON command signal to the solenoid valve to open the solenoid valve, cooling water flows through the water-cooled tube 149, starting the cooling of the base portion 129 by the water-cooled tube 149. When the CPU 201 sends an OFF command signal to the solenoid valve to close the solenoid valve, the cooling water stops flowing through the water-cooled tube 149, stopping the cooling of the base portion 129 by the water-cooled tube 149.

The CPU 201 controls the operation of the turbomolecular pump 100 and performs TMS control to operate the turbomolecular pump 100 according to one of specifications 1 to 4 shown in FIG. 7 (operating specifications). As shown in FIG. 7, the setting of the rated rotational speed of the motor 121 that drives and rotates the rotor blades 102 of the turbomolecular pump 100 varies depending on the specification. Specifically, rotational speed ω2 set as the rated rotational speed of the motor 121 in specification 2 and rotational speed ω3 set as the rated rotational speed of the motor 121 in specification 3 are the same as rotational speed ω1 of the motor 121 set as the rated rotational speed in specification 1. However, rotational speed ω4 set as the rated rotational speed of the motor 121 in specification 4 is less than rotational speed ω1.

Also, as shown in FIG. 7, the control mode of TMS control performed by the CPU 201 and the TMS set temperature, which is the target temperature in the TMS control, also vary depending on the specification. In specification 1, TMS control is not performed, and the TMS set temperature is not set. In specification 1, the solenoid valve that controls the flow of cooling water to the water-cooled tube 149 is always open, and the cooling by the water-cooled tube 149 is always performed. In specification 2, TMS control is performed in a TMS standard mode that uses temperature T2 as the TMS set temperature. In specification 3, TMS control is performed in a TMS first special mode that uses temperature T3, which is higher than temperature T2, as the TMS set temperature. In specification 4, TMS control is performed in a TMS second special mode that uses temperature T4, which is higher than temperature T3, as the TMS set temperature. In specification 1, in which TMS control is not performed, neither control of the heating by the heater nor control of the cooling by the water-cooled tube 149 is performed. In specifications 2 and 4 in which TMS control of the TMS standard mode, the TMS first special mode, or the TMS second special mode is performed, control of the heating by the heater and control of the cooling by the water-cooled tube 149 are performed. As described above, the specifications have different control modes of TMS control and therefore differ in whether to perform control of the heating by the heater, and in whether to perform control of the cooling by the water-cooled tube 149.

The exhaust performance of the turbomolecular pump 100, such as the exhaust speed of the turbomolecular pump 100, the compression ratio of the turbomolecular pump 100, and the ultimate pressure of the turbomolecular pump 100, the permissible flow rate of the turbomolecular pump 100, and the pump internal temperature, which is the temperature of the gas flow passage inside the turbomolecular pump 100, all depend on the rated rotational speed of the motor 121 and the TMS set temperature, and vary depending on the specification. Specifically, in specifications 2 and 3, the exhaust speed, compression ratio, and ultimate pressure of the turbomolecular pump 100 are equivalent to those in specification 1, which is the standard. In contrast, in specification 4, they are lower than in specification 1. As for the permissible flow rate of the turbomolecular pump 100, specification 2 is lower than specification 1, specification 3 is lower than specification 2, and specification 4 is lower than specification 2 and higher than specification 3. Pump internal temperature TP2 in specification 2 is higher than temperature TP1, which is the pump internal temperature in specification 1, pump internal temperature TP3 in specification 3 is higher than pump internal temperature TP2 in specification 2, and pump internal temperature TP4 in specification 4 is higher than pump internal temperature TP3 in specification 3.

In this example, the turbomolecular pump 100 is described as having four types of specifications of specifications 1 to 4, but this is merely an example. The turbomolecular pump 100 may have three or less types of specifications, or five or more types of specifications. Also, the settings of the specifications shown in FIG. 7 are merely an example, and the specification of the turbomolecular pump 100 can be set freely.

The storage portion 202 of the controller 200 stores in advance specification information indicating the settings relating to the operating state of the turbomolecular pump 100 in specifications 1 to 4 shown in FIG. 7. Based on this specification information, the CPU 201 controls the operation of the turbomolecular pump 100 and also performs TMS control to operate the turbomolecular pump 100 according to one of specifications 1 to 4. Specifically, the CPU 201 identifies the rated rotational speed of the motor 121 that corresponds to the currently set specification by referring to the specification information, and transmits a command signal to the turbomolecular pump 100 via the wired communication portion 203 to set the control parameters of the turbomolecular pump 100 such that the rated rotational speed of the motor 121 becomes the identified rated rotational speed. Furthermore, the CPU 201 identifies the control mode of TMS control and the TMS set temperature that correspond to the currently set specification by referring to the specification information, and performs TMS control of the identified control mode with the identified TMS set temperature as the target temperature.

As will be described below, upon receiving an instruction from a user to change the specification of the turbomolecular pump 100 to the specification designated by the user, the remote controller 300 transmits a setting change command signal, which is a command signal indicating to change the specification of the turbomolecular pump 100 to the specification designated by the user, to the controller 200 through remote communication. When the remote communication portion 204 receives the setting change command signal from the remote controller 300, the CPU 201 changes the specification (operating specification) of the turbomolecular pump 100, which is an example of a setting relating to the operating state of the turbomolecular pump 100, based on the received setting change command signal.

Specifically, when the remote communication portion 204 receives the setting change command signal, the CPU 201 refers to the above-described specification information to identify the rated rotational speed of the motor 121 that corresponds to the specification after change of the turbomolecular pump 100 indicated by the above setting change command signal. Then, the CPU 201 transmits a command signal to the turbomolecular pump 100 via the wired communication portion 203 and changes the control parameters of the turbomolecular pump 100 to change the rated rotational speed of the motor 121 from the rated rotational speed that corresponds to the currently set specification of the turbomolecular pump 100 to the identified rated rotational speed that corresponds to the specification after change of the turbomolecular pump 100.

Furthermore, when the remote communication portion 204 receives a setting change command signal, the CPU 201 refers to the specification information to determine the control mode of TMS control and the TMS set temperature that correspond to the specification after change of the turbomolecular pump 100 indicated by the above setting change command signal. Then, the CPU 201 changes the control mode of TMS control from the control mode that corresponds to the currently set specification of the turbomolecular pump 100 to the identified control mode that corresponds to the specification after change of the turbomolecular pump 100, and also changes the TMS set temperature from the TMS set temperature that corresponds to the currently set specification of the turbomolecular pump 100 to the identified TMS set temperature that corresponds to the specification after change of the turbomolecular pump 100. In this manner, when the remote communication portion 204 receives a setting change command signal from the remote controller 300, the CPU 201 changes, based on the received setting change command signal, the control mode of TMS control and the TMS set temperature, which are settings relating to the operations of the heater and the water-cooled tube 149 as the specification changing devices that change the operating specification of the turbomolecular pump 100.

When the remote communication portion 204 receives a setting change command signal while the turbomolecular pump 100 is in operation and TMS control is in progress, the CPU 201 changes the specification of the turbomolecular pump 100 based on the received setting change command signal and changes the control mode of TMS control and the TMS set temperature without stopping the operation of the turbomolecular pump 100 and without stopping the TMS control. Specifically, when the remote communication portion 204 receives a setting change command signal while the turbomolecular pump 100 is in operation, the CPU 201 transmits a command signal to the turbomolecular pump 100 via the wired communication portion 203 to change the rated rotational speed of the motor 121 from the currently set rated rotational speed to the rated rotational speed that corresponds to the specification after change of the turbomolecular pump 100 without stopping the driving and rotation of the rotor blades 102 by the motor 121. Also, when the remote communication portion 204 receives a setting change command signal while TMS control is in progress, the CPU 201 changes the control mode of TMS control from the currently set control mode to the control mode that corresponds to the specification after change of the turbomolecular pump 100, and also change the TMS set temperature from the currently set TMS set temperature to the TMS set temperature that corresponds to the specification after change of the turbomolecular pump 100, without stopping the TMS control.

Figure 8:
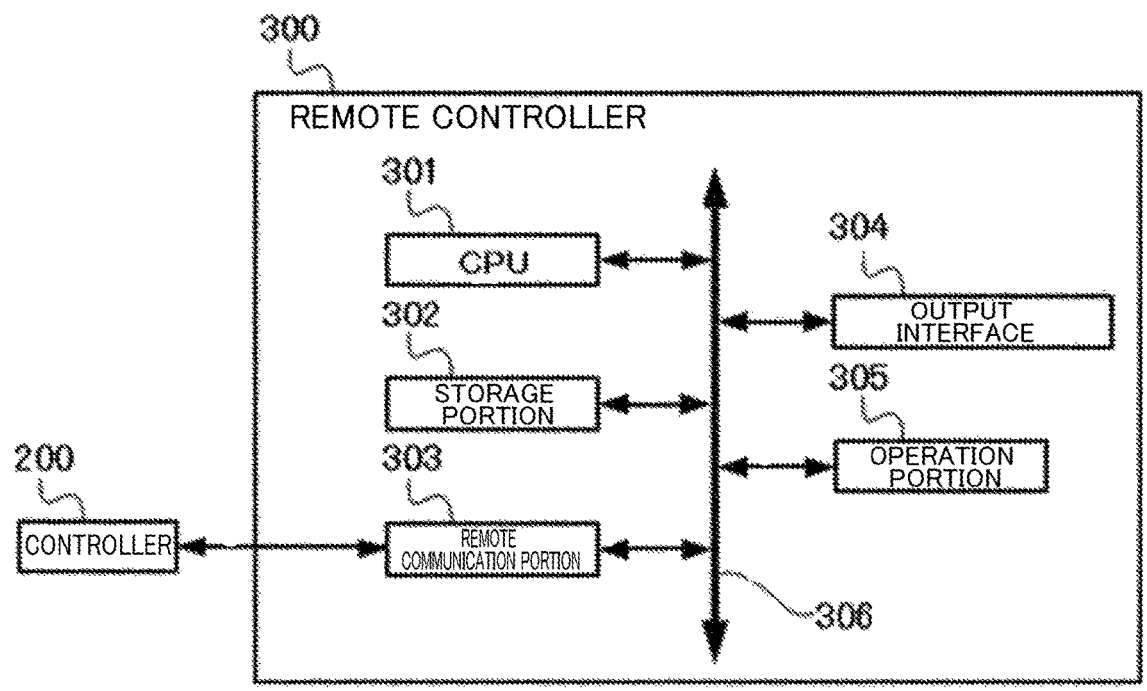
FIG. 8 is a diagram showing a configuration of a remote controller according to an example of the present disclosure.

The configuration and function of the remote controller 300 are now described. As shown in FIG. 8, the remote controller 300 includes a CPU 301, a storage portion 302, a remote communication portion 303, an output interface 304, an operation portion 305, and a system bus 306.

The CPU 301 performs various types of processing according to programs and data stored in the storage portion 302. The storage portion 302 includes non-volatile memory (not shown) such as ROM, flash memory, or EPROM, and stores, in a non-volatile manner, programs and data used by the CPU 301 to perform various types of processing. Also, the storage portion 302 includes RAM (not shown), which functions as a work area for the CPU 301. The remote communication portion 303 performs remote communication with a device external to the remote controller 300 to transmit and receive signals. Specifically, the remote communication portion 303 includes a remote I/O unit (not shown) and uses this remote I/O unit to transmit and receive signals to and from the controller 200 by performing remote communication through a communication network using a serial communication system. The remote communication portion 303 sends command signals to the controller 200 by performing remote communication with the controller 200. The remote communication portion 303 is an example of a remote signal transmitting means.

The output interface 304 presents information on the operating state of the turbomolecular pump 100 to the user. Specifically, the output interface 304 includes an LCD panel (not shown), and displays on this LCD panel various types of images for notifying the operating state of the turbomolecular pump 100, such as a message indicating the setting of the operating specification of the turbomolecular pump 100, a message indicating the current operating state of the turbomolecular pump 100, and an error message notifying a malfunction of the turbomolecular pump 100. The operation portion 305 includes operators, such as a keyboard, touch panel, and operation switches, and receives input of various instructions by the user according to the user's operation on the operators. The system bus 306 is a transmission path for commands and data, and interconnects the CPU 301 to the operation portion 305.

The functions of the CPU 301 are described in detail below. The CPU 301 remotely controls the turbomolecular pump 100 according to an instruction input by the user by operating the operation portion 305. Specifically, the CPU 301 remotely controls the turbomolecular pump 100 by causing the remote communication portion 303 to transmit a command signal corresponding to the instruction received by the operation portion 305 to the controller 200, and causing the controller 200 to control the operation of the turbomolecular pump 100 according to the received command signal. The CPU 301 is an example of a remote control means. Specifically, when the user operates the operation portion 305 to input an instruction to start the turbomolecular pump 100, the CPU 301 causes the remote communication portion 303 to transmit a command signal indicating to start the turbomolecular pump 100 to the controller 200. When the user operates the operation portion 305 to input an instruction to stop the turbomolecular pump 100, the CPU 301 causes the remote communication portion 303 to transmit to the controller 200 a command signal indicating to stop the turbomolecular pump 100.

When the user operates the operation portion 305 to input an instruction to check the setting of the operating specification of the turbomolecular pump 100, the CPU 301 causes the remote communication portion 303 to transmit a command signal indicating to check the setting to the controller 200. When the controller 200 transmits a signal indicating the setting of the operating specification of the turbomolecular pump 100 to the remote controller 300 in response to receiving the command signal, the CPU 301 receives this signal via the remote communication portion 303 and causes the output interface 304 to present the user with the setting based on the received signal. When the user operates the operation portion 305 to input an instruction to check the setting of the current operating specification of the turbomolecular pump 100, the CPU 301 causes the remote communication portion 303 to transmit a command signal indicating to check the operating specification to the controller 200. When the controller 200 transmits a signal indicating the current operating specification of the turbomolecular pump 100 to the remote controller 300 in response to receiving the command signal, the CPU 301 receives this signal via the remote communication portion 303 and causes the output interface 304 to present the user with the operating specification based on the received signal.

Upon receiving an instruction issued by the user by operating the operation portion 305 to change the specification of the turbomolecular pump 100 to the specification designated by the user, the CPU 301 causes the remote communication portion 303 to transmit to the controller 200 a setting change command signal that is a command signal indicating to change the specification of the turbomolecular pump 100 to the user-designated specification to cause the controller 200 to change the specification of the turbomolecular pump 100 based on the received setting change command signal. In one example, the user may refer to the schedule of the processes performed in the chamber XR of the semiconductor manufacturing apparatus X, and operates the operation portion 305 to give instructions for the specification of the turbomolecular pump 100 to be changed in time with the switching of the processes performed in the chamber XR.

Figure 9:
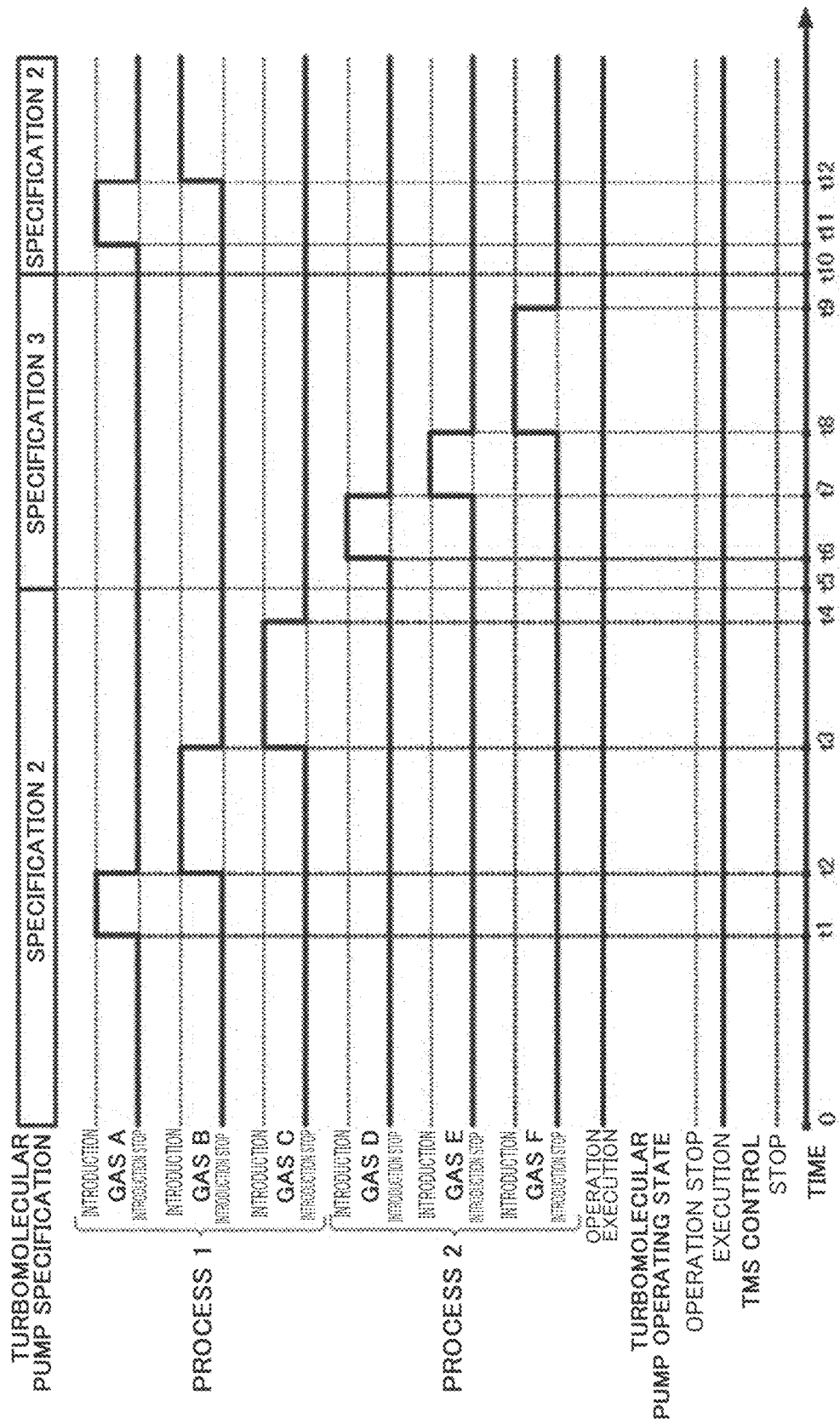
FIG. 9 is a timing chart for illustrating changes of the specification of a turbomolecular pump according to an example of the present disclosure.

Referring to the timing chart of FIG. 9, the specification change of the turbomolecular pump 100 is now described using as an example a situation where process 1 and process 2 are performed in the chamber XR. In process 1, it is assumed that gas A, gas B, and gas C are introduced as process gases into the chamber XR by the semiconductor manufacturing apparatus X. In process 2, it is assumed that gas D, gas E, and gas F are introduced as process gases into the chamber XR by the semiconductor manufacturing apparatus X. In the following description, a situation is used as an example where the controller 200 causes, from time 0, the turbomolecular pump 100 to start operation according to specification 2, which is the specification corresponding to process 1, and starts the TMS control corresponding to specification 2. That is, from time 0, the controller 200 causes the motor 121 of the turbomolecular pump 100 to start rotating at rotational speed $\omega 2$, which is the rated rotational speed corresponding to specification 2. Also, from time 0, the controller 200 starts TMS control in the TMS standard mode, which uses temperature T2 as the TMS set temperature.

In process 1, the semiconductor manufacturing apparatus X starts introducing gas A at time t1, stops introducing gas A and starts introducing gas B at time t2, stops introducing gas B and starts introducing gas C at time t3, and stops introducing gas C at time t4. In process 2, the semiconductor manufacturing apparatus X starts introducing gas D at time t6, which is after time t4, stops introducing gas D and starts introducing gas E at time t7, stops introducing gas E and start introducing gas F at time t8, and stops introducing gas F at time t9. Then, in process 1, the semiconductor manufacturing apparatus X starts introducing gas A at time t11, which is after time t9, and stops introducing gas A and starts introducing gas B at time t12.

A situation is described below as an example where, at a point in time after time t4, at which the introduction of gas C is stopped in process 1, and before time t6, at which the introduction of gas D is started in process 2, the user operates the remote controller 300 to input an instruction to change the specification of the turbomolecular pump 100 from specification 2, which is the currently set specification, to specification 3, which is the specification corresponding to process 2. In this situation, according to the instruction by the user, the remote controller 300 transmits to the controller 200 a setting change command signal indicating to switch the specification of the turbomolecular pump 100 from specification 2 to specification 3, which is the specification designated by the user. In the following description, it is assumed that the controller 200 changes the specification of the turbomolecular pump 100 from specification 2 to specification 3 in response to a setting change command signal received from the remote controller 300 at time t5, which is after time t4 and before time t6.

At time t5, the controller 200 switches the specification of the turbomolecular pump 100 from specification 2 to specification 3 without stopping the operation of the turbomolecular pump 100 and without stopping the TMS control. Specifically, the controller 200 refers to the specification information stored in the storage portion 202 and identifies rotational speed $\omega 3$, which is the rated rotational speed corresponding to specification 3. The controller 200 transmits a command signal to the turbomolecular pump 100 to change the control parameters, thereby changing the rated rotational speed of the motor 121 from rotational speed $\omega 2$, which is the rated rotational speed corresponding to specification 2, to rotational speed $\omega 3$, without stopping the driving and rotation of the rotor blades 102 by the motor 121. Also, the controller 200 refers to the specification information and thus identifies the TMS first special mode, which is the control mode of TMS control corresponding to specification 3, and temperature T3, which is the TMS set temperature corresponding to specification 3. Then, without stopping the TMS control, the controller 200 changes the control mode of TMS control from the TMS standard mode, which corresponds to specification 2, to the TMS first special mode, and also changes the TMS set temperature from temperature T2, which corresponds to specification 2, to temperature T3.

A situation is described below as an example where, at a point in time after time t9, at which the introduction of gas F is stopped in process 2, and before time t11, at which the introduction of gas A is started in process 1, the user operates the remote controller 300 to input an instruction to change the specification of the turbomolecular pump 100 from specification 3, which is the currently set specification, to specification 2, which is the specification corresponding to process 1. In this situation, according to the instruction by the user, the remote controller 300 transmits to the controller 200 a setting change command signal indicating to switch the specification of the turbomolecular pump 100 from specification 3 to specification 2, which is specification designated by the user. In the following description, it is assumed that the controller 200 changes the specification of the turbomolecular pump 100 from specification 3 to specification 2 in response to a setting change command signal received from the remote controller 300 at time t10, which is after time t9 and before time t11.

At time t10, the controller 200 switches the specification of the turbomolecular pump 100 from specification 3 to specification 2 without stopping the operation of the turbomolecular pump 100 and without stopping the TMS control. That is, the controller 200 transmits a command signal to the turbomolecular pump 100 to change the control parameters, thereby changing the rated rotational speed of the motor 121 from rotational speed $\omega 3$, which is the rated rotational speed corresponding to specification 3, to rotational speed $\omega 2$, which corresponds to specification 2, without stopping the driving and rotation of the rotor blades 102 by the motor 121. Also, without stopping the TMS control, the controller 200 changes the control mode of TMS control from the TMS first special mode, which corresponds to specification 3, to the TMS standard mode, which corresponds to specification 2, and also changes the TMS set temperature from temperature T3, which corresponds to specification 3, to temperature T2, which corresponds to specification 2.

As described above, the turbomolecular pump 100 of the vacuum pump 10 is configured to be operable under any of specifications 1 to 4, and operates under one of specifications 1 to 4 according to the control by the controller 200 of the vacuum pump 10. This configuration can reduce the cost of purchasing vacuum pumps and also reduce the space required to store the vacuum pumps as compared to a situation where a vacuum pump of specification 1, a vacuum pump of specification 2, a vacuum pump of specification 3, and a vacuum pump of specification 4 are each purchased and kept in the factory where the semiconductor manufacturing apparatus X is installed.

Such advantages of the vacuum pump 10 according to the present disclosure are particularly prominent when the semiconductor manufacturing apparatus X has a plurality of chambers XR, each chamber performing a different type of process. Specifically, when the semiconductor manufacturing apparatus X includes a plurality of chambers XR in which different types of processes are performed, different types of vacuum pumps, each operating under the specification corresponding to the process performed in the corresponding chamber XR, may be coupled to the chambers XR. In such a case, when a backup vacuum pump is prepared to replace a vacuum pump that is broken or receives maintenance, different types of vacuum pumps may be prepared for the respective chambers XR as backup vacuum pumps. This may burden the user with the cost of purchasing a large number of backup vacuum pumps and the securing of the space required to store the large number of backup vacuum pumps.

In contrast, when the vacuum pump 10 according to the present disclosure is attached to each of the chambers XR of the semiconductor manufacturing apparatus X as a universal vacuum pump that is operable under any of the specifications desired for the processes performed in the chamber XR, a backup vacuum pump 10 for one chamber XR can also serve as the backup vacuum pump 10 for another chamber XR. Accordingly, as compared to the above example in which different types of vacuum pumps are prepared as backup vacuum pumps for the respective chambers XR, it is possible to reduce the number of vacuum pumps to be prepared as backup vacuum pumps, reduce the cost of purchasing vacuum pumps, and reduce the space required to store the vacuum pumps.

As described above, when the remote communication portion 204 receives a setting change command signal from the remote controller 300, the controller 200 changes the specification of the turbomolecular pump 100, which is an example of a setting relating to the operating state of the turbomolecular pump 100, based on the received setting change command signal. Such a configuration allows the user to change the specification of the turbomolecular pump 100 by operating the remote controller 300 installed in a place away from the vacuum pump 10, without going to the place where the vacuum pump 10 is installed and controlling the controller 200. Thus, such a configuration can reduce the workload of the user.

Such an advantage of the vacuum pump 10 according to the present disclosure is particularly prominent when the semiconductor manufacturing apparatus X includes a plurality of chambers XR, and a vacuum pump 10 is attached to each chamber as a universal vacuum pump described above. Specifically, the workload of the user would be significant if the user needs to go to the place where the vacuum pumps 10 are installed and attached to the respective chambers XR of the semiconductor manufacturing apparatus X and manually operate the controller 200 so as to set the specifications of the vacuum pumps 10 corresponding to the processes to be performed in the chambers XR. However, since the vacuum pump 10 is configured so that its specification is changeable according to an instruction input by the user by operating the remote controller 300, the user can change the specification of the vacuum pump 10 without going to the place where the vacuum pump 10 is installed and operating the controller 200. Such a configuration can reduce the workload of the user accordingly.

Furthermore, in the present example, when the remote communication portion 204 receives a setting change command signal, the controller 200 changes, based on the received setting change command signal, the control mode of TMS control and the TMS set temperature, which are settings relating to the operations of the heater and the water-cooled tube 149 as specification changing devices that change the operating specification of the turbomolecular pump 100. Such a configuration allows the user to change the setting relating to the operation of a specification changing device and change the operating specification of the turbomolecular pump 100 by operating the remote controller 300, without going to the place where the vacuum pump 10 is installed and operating controller 200. Thus, such a configuration can reduce the workload of the user. More specifically, the user can change, by operating the remote controller 300, the settings relating to the operations of the heater for heating the base portion 129 and the water-cooled tube 149 for cooling the base portion 129, which are specification changing devices, and can change the temperature inside the turbomolecular pump 100, which is an operating specification of the turbomolecular pump 100, without going to the place where the vacuum pump 10 is installed and operating the controller 200.

Also, in the present example, when the remote communication portion 204 receives a setting change command signal while the turbomolecular pump 100 is in operation, the controller 200 changes the specification of the turbomolecular pump 100 based on the received setting change command signal without stopping the operation of the turbomolecular pump 100. According to such a configuration, as compared to a configuration that changes the specification of the turbomolecular pump 100 after temporarily stopping the turbomolecular pump 100 in operation and restarts the operation of the turbomolecular pump 100 after completing the specification change, the operation time can be shortened and the user's convenience can be improved.

Such advantages of the vacuum pump 10 according to the present disclosure are particularly prominent when the semiconductor manufacturing apparatus X performs a plurality of processes in a chamber XR, that is, when a plurality of processes are performed in one chamber XR. Specifically, performing a plurality of processes in one chamber XR allows the semiconductor manufacturing apparatus X to be smaller in size than a configuration in which different processes are performed in different chambers XR. Additionally, the time to move the semiconductor substrates that have undergone a process in one chamber XR to a chamber XR in which another process is performed can be eliminated, thereby shortening the time to perform the processes. In one specific example of performing a plurality of processes in one chamber XR, the process of etching the semiconductor substrates and the process of coating semiconductor substrates are performed in one chamber XR.

Also, in the present example, when a setting change command signal is received from the remote controller 300 while the turbomolecular pump 100 of the vacuum pump 10 is in operation, the controller 200 of the vacuum pump 10 changes the specification of the turbomolecular pump 100 based on the received setting change command signal without stopping the operation of the turbomolecular pump 100. According to such a configuration, when performing a second process after performing a first process in a chamber XR, the specification of the vacuum pump 10 attached to the chamber XR can be changed from the specification corresponding to the first process to the specification corresponding to the second process without stopping the operation of the vacuum pump 10. Thus, as compared to a configuration that changes the specification of the turbomolecular pump 100 to the specification corresponding the second process after temporarily stopping the turbomolecular pump 100 in operation in the specification corresponding to the first process and restarts the operation of the turbomolecular pump 100 after completing the specification change, the operation time can be shortened and the user's convenience can be improved.

Also, in the present example, when the remote communication portion 204 receives a setting change command signal while TMS control is in progress, the controller 200 changes the specification of the turbomolecular pump 100 based on the received setting change command signal and changes the control mode of TMS control and the TMS set temperature without stopping the TMS control. Such a configuration can shorten the operation time and improve the user's convenience, as compared to a configuration that changes the specification of the turbomolecular pump 100 and changes the control mode of TMS control and the TMS set temperature after temporarily stopping the TMS control in progress and restarts the TMS control after completing the specification change.

As described above, the vacuum pump 10 includes the turbomolecular pump 100, which exhausts gas inside the semiconductor manufacturing apparatus X as an example of an exhaust target apparatus, and the controller 200, which performs control on the turbomolecular pump 100. The controller 200 includes the remote communication portion 204, which receives a command signal from the remote controller 300, which remotely controls the turbomolecular pump 100, and changes the specification of the turbomolecular pump 100, which is an example of a setting relating to the operating specification of the turbomolecular pump 100, based on a setting change command signal received by the remote communication portion 204. Such a configuration can reduce the workload of the users and field service engineers.

When the remote communication portion 204 receives a setting change command signal from the remote controller 300 while the turbomolecular pump 100 is in operation, the controller 200 changes the specification of the turbomolecular pump 100 based on the setting change command signal without stopping the operation of the turbomolecular pump 100. Such a configuration can improve the user convenience.

The vacuum pump 10 includes, as specification changing devices that change the operating specification of the turbomolecular pump 100, the heater for heating the turbomolecular pump 100 and the water-cooled tube 149 for cooling the turbomolecular pump 100. Based on a setting change command signal received by the remote communication portion 204, the controller 200 changes the setting relating to the operation of a specification changing device. Such a configuration can reduce the workload of the users and field service engineers.

The remote controller 300 includes the remote communication portion 303, which transmits a command signal to the controller 200 provided in the vacuum pump 10 to perform control on the turbomolecular pump 100 for exhausting the gas inside the semiconductor manufacturing apparatus X, and the CPU 301, which causes the remote communication portion 303 to transmit a command signal to the controller 200 to remotely control the turbomolecular pump 100. The CPU 301 causes the remote communication portion 303 to transmit a setting change command signal to the controller 200, thereby causing the controller 200 to change the specification of the turbomolecular pump 100 based on the received setting change command signal. Such a configuration can reduce the workload of the users and field service engineers.

Although the present disclosure has been described above with reference to the examples, the present disclosure is not limited to the above examples, and various modifications can be made without departing from the scope of the present disclosure. The above examples and modifications may be combined in various manners.

For example, in the above example, when the remote communication portion 204 receives a setting change command signal, the controller 200, which is one example of a specification setting device, may change the operating specification of a control target device that is included in the turbomolecular pump 100 and capable of changing the operating specification so as to change a setting relating to the operating specification of the turbomolecular pump 100 based on the setting change command signal. Such a configuration can reduce the workload of the users and field service engineers. In one example, the controller 200 may change the rotational speed of the motor 121, which is an example of a control target device, to change the setting relating to the operating specification of the turbomolecular pump 100. The rotational speed of the motor 121 is an example of the operating specification of the motor 121.

In the modification described above, the controller 200 may be provided separately from the turbomolecular pump 100 and placed at a location away from the turbomolecular pump 100. The controller 200 may be configured such that, when the user inputs an instruction to change the specification of the turbomolecular pump 100 by operating the operation portion 206 while the controller 200 is in operation in the manual operation control mode described above, the CPU 201 changes the operating specification (such as the rotational speed) of a control target device (such as the motor 121) to change the specification of the turbomolecular pump 100. Such a configuration can improve user convenience.

In the description of the above example, the controller 200 changes the specification of the turbomolecular pump 100 based on a setting change command signal received from the remote controller 300, but this is merely an example. Based on a command signal received from the remote controller 300, the controller 200 may change any settings relating to the operating specification of the turbomolecular pump 100. For example, based on a command signal received from the remote controller 300, the controller 200 may change only the rotational speed of the motor 121. A modification is described below in which the controller 200 changes only the rotational speed of the motor 121 based on a command signal received from the remote controller 300.

In this modification, the turbomolecular pump 100 includes a rotor blade temperature sensor (not shown), which measures the temperature of the rotor blades 102. The controller 200 receives a detection signal output from the rotor blade temperature sensor via the wired communication portion 203, and transmits a rotor blade temperature signal indicating the temperature of the rotor blades 102 to the remote controller 300 based on the received detection signal. The remote controller 300 constantly monitors the temperature of the rotor blades 102 based on the rotor blade temperature signal received from the controller 200.

Based on the difference between the current temperature of the rotor blades 102 indicated by the rotor blade temperature signal received from the controller 200 and the set temperature that is set in advance, the remote controller 300 calculates the maximum set rotational speed that can be obtained for the motor 121. The remote controller 300 transmits to the controller 200 a rotational speed change command signal indicating to rotate the motor 121 at the calculated set rotational speed, thereby causing the controller 200 to perform control that causes the motor 121 to rotate at this set rotational speed. The controller 200 drives the motor 121 based on the difference between the calculated set rotational speed indicated by the rotational speed change command signal received from the remote controller 300 and the current rotational speed of the motor 121 indicated by the detection signal of the rotational speed sensor of the motor 121 and thus rotates the motor 121 at the calculated set rotational speed. Such a configuration can increase the rotational speed of the motor 121 while keeping the temperature of the rotor blades 102 within the limited range, thereby maximizing the exhaust performance of the turbomolecular pump 100.

When the current temperature of the rotor blades 102 indicated by the rotor blade temperature signal received from the controller 200 exceeds a preset permissible value, the remote controller 300 transmits to the controller 200 a command signal indicating to reduce the rotational speed of the motor 121 to cause the controller 200 to reduce the rotational speed of the motor 121. This lowers the frequency of collision between the rotor blades 102 and gas molecules. Such a configuration can lower the temperature of the rotor blades 102, thereby limiting deterioration of the rotor blades 102 due to heat.

Furthermore, by applying a program, an existing vacuum pump controller and a remote controller can be made to function as the vacuum pump controller and the remote controller according to the present disclosure. That is, by applying a program for achieving the functions of the vacuum pump controller and the remote controller according to the present disclosure such that the processor, such as a CPU, that controls the existing vacuum pump controller and the remote controller can execute the program, the existing vacuum pump controller and the remote controller can function as the vacuum pump controller and the remote controller according to the present disclosure.

Such a program may be applied in any manner. The program can be applied by storing it in a computer-readable storage medium, such as a flexible disk, compact disc (CD)-ROM, digital versatile disc (DVD)-ROM, memory card, or the like. Furthermore, a program can be superimposed on a carrier wave and applied via a communication medium such as the Internet. For example, the program may be posted on a bulletin board system (BBS) on a communication network to be distributed. It may be configured that the above processing is executable by starting this program and executing it in the same manner as other application programs under the control of the operating system (OS).

The invention claimed is:

1. A vacuum pump comprising:
a pump main body configured to exhaust gas inside an exhaust target apparatus; and
a controller configured to perform control on the pump main body, wherein:
the exhaust apparatus is configured such that a plurality of gases is to be introduced there, the controller includes:
a storage configured to store a plurality of operating specifications of the pump main body prepared in plural as a set of specification in which a rated rotational speed of a motor of the pump main body and a setting temperature controlled by a heater and a cooling pipe of the pump main body are associated with each other; and
a remote signal receiver configured to receive a command signal from a remote controller that remotely controls the pump main body, the command signal including an instruction for changing the plurality of operating specifications of the pump main body, and
the controller is configured to change, before a first gas of the plurality of gases is introduced, the rated rotational speed of the motor and the setting temperature to be a first operating specification from the plurality of operating specifications based on the command signal received by the remote signal receiver and the controller is configured to change, before a second gas of the plurality of gases is introduced, the rated rotational speed of the motor and the setting temperature to be a second operating specification from the plurality of operating specifications based on the command signal received by the remote signal receiver.

2. The vacuum pump according to claim 1, wherein the controller is configured to, when the remote signal receiver receives the command signal from the remote controller while the pump main body is in operation, change a setting of the pump main body based on the command signal without stopping the operation of the pump main body.

3. The vacuum pump according to claim 1, further comprising:
a specification changing device configured to change an operating specification of the plurality of operating specifications of the pump main body, wherein:
the controller is configured to change a setting relating to operation of the specification changing device based on the command signal received by the remote signal receiver.

4. The vacuum pump according to claim 3, wherein the specification changing device is the heater configured to heat the pump main body or the cooling pipe configured to cool the pump main body.

5. The vacuum pump according to claim 1, further comprising:
a control target device that is capable of changing the operating specification of the pump main body; and
a specification setting device configured to change an operating specification of the plurality of operating specifications of the control target device to change the rated rotational speed of the motor and the setting temperature to be the operating specification from the plurality of operating specifications.

6. The vacuum pump according to claim 1, wherein the remote controller comprises:
a remote signal transmitting means configured to transmit the command signal to the controller; and
a remote control means configured to cause the remote signal transmitting means to transmit the command signal to the controller to remotely control the pump main body.

* * * * *